(12) United States Patent
Aoyagi et al.

(10) Patent No.: US 12,678,862 B2
(45) Date of Patent: Jul. 14, 2026

(54) ADDITIVE MANUFACTURING DEVELOPMENT METHOD AND THREE-DIMENSIONAL ADDITIVE MANUFACTURING SYSTEM

(71) Applicant: JEOL LTD., Tokyo (JP)

(72) Inventors: Kenta Aoyagi, Sendai (JP); Akihiko Chiba, Sendai (JP); Hideki Kyogoku, Hiroshima (JP); Shin-ichi Kitamura, Tokyo (JP); Michiaki Hashitani, Tokyo (JP)

(73) Assignee: JEOL LTD., Tokyo (JP)

( * ) Notice: Subject to any disclaimer, the term of this patent is extended or adjusted under 35 U.S.C. 154(b) by 308 days.

(21) Appl. No.: 18/278,805

(22) PCT Filed: Feb. 26, 2021

(86) PCT No.: PCT/JP2021/007535
§ 371 (c)(1),
(2) Date: Aug. 24, 2023

(87) PCT Pub. No.: WO2022/180842
PCT Pub. Date: Sep. 1, 2022

(65) Prior Publication Data
US 2024/0139815 A1      May 2, 2024

(51) Int. Cl.
*B22F 10/80* (2021.01)
*G06T 7/00* (2017.01)
(Continued)

(52) U.S. Cl.
CPC ............ *B22F 10/80* (2021.01); *G06T 7/0006* (2013.01); *B33Y 50/00* (2014.12); *G06T 2207/30136* (2013.01)

(58) Field of Classification Search
CPC .......... B22F 10/80; B22F 10/28; B22F 12/90; B22F 10/85; G06T 7/0006;
(Continued)

(56) References Cited

U.S. PATENT DOCUMENTS

2018/0141123 A1      5/2018  Revanur et al.
2018/0229303 A1*     8/2018  Burlatsky .............. B33Y 50/02
(Continued)

FOREIGN PATENT DOCUMENTS

JP        2019177494 A     10/2019
JP        2020-519762 A     7/2020
(Continued)

OTHER PUBLICATIONS

C.R. Pobel, C. Arnold, F. Osmanlic, Z. Fu, C. Komer, "Immediate development of processing windows for selective electron beam melting using layerwise monitoring via backscattered electron detection", Materials Letters, 249 (2019) 70-72.
(Continued)

*Primary Examiner* — Michael J Brown
(74) *Attorney, Agent, or Firm* — DiPerna Law Firm, P.C.

(57)      ABSTRACT

An additive manufacturing development method includes predicting a defect that occurs in a product based on a combination of a plurality of design data and a plurality of manufacturing conditions, collecting defect detection data for defect detection by monitoring the product during manufacturing in accordance with the combination of the plurality of design data and the plurality of manufacturing conditions, and generating a process map in which the plurality of manufacturing conditions are plotted using the predicted defect and the collected defect detection data. The method further includes collecting defect repair data for defect repair by monitoring the product during manufacturing and repairing a defect detected from the product, and storing the defect (Continued)

and the defect repair data in association with each other using the defect repair data and a repair result.

6 Claims, 12 Drawing Sheets

(51) Int. Cl.
    *B29C 64/393*        (2017.01)
    *B33Y 30/00*         (2015.01)
    *B33Y 50/00*         (2015.01)
(58) Field of Classification Search
    CPC .......... G06T 2207/30136; B33Y 50/00; B33Y
             50/02; B33Y 30/00; Y02P 10/25; B29C
                                  64/393
    USPC ........................................................ 700/110
    See application file for complete search history.

(56) References Cited

U.S. PATENT DOCUMENTS

2020/0376552 A1 *  12/2020  Fukuda ................. B29C 64/386
2021/0299754 A1 *   9/2021  Aoyagi ................. B29C 64/393

FOREIGN PATENT DOCUMENTS

| | | | |
|---|---|---|---|
| JP | 2020203484 | A | 12/2020 |
| WO | 2018181833 | A1 | 10/2018 |
| WO | 2020/026306 | A1 | 2/2020 |
| WO | 2020/039581 | A1 | 2/2020 |

OTHER PUBLICATIONS

W. King, A.T. Anderson, R.M. Ferencz, N.E. Hodge, C. Kamath, S.A. Khairallah, "Overview of modelling and simulation of metal powder bed fusion process at Lawrence Livermore National Laboratory", Materials Science and Technology, vol. 31, No. 8 (2015) 957-968.
International Search Report issued on May 18, 2021 in connection with PCT/JP2021/007535.
Extended European Search Report issued in connection with European Patent Appln. No. 21927942.9 on Mar. 5, 2024 (10 pages).
Notice of Reasons for Refusal issued on Jun. 11, 2024 in Japanese Patent Application No. 2023-502002.

* cited by examiner

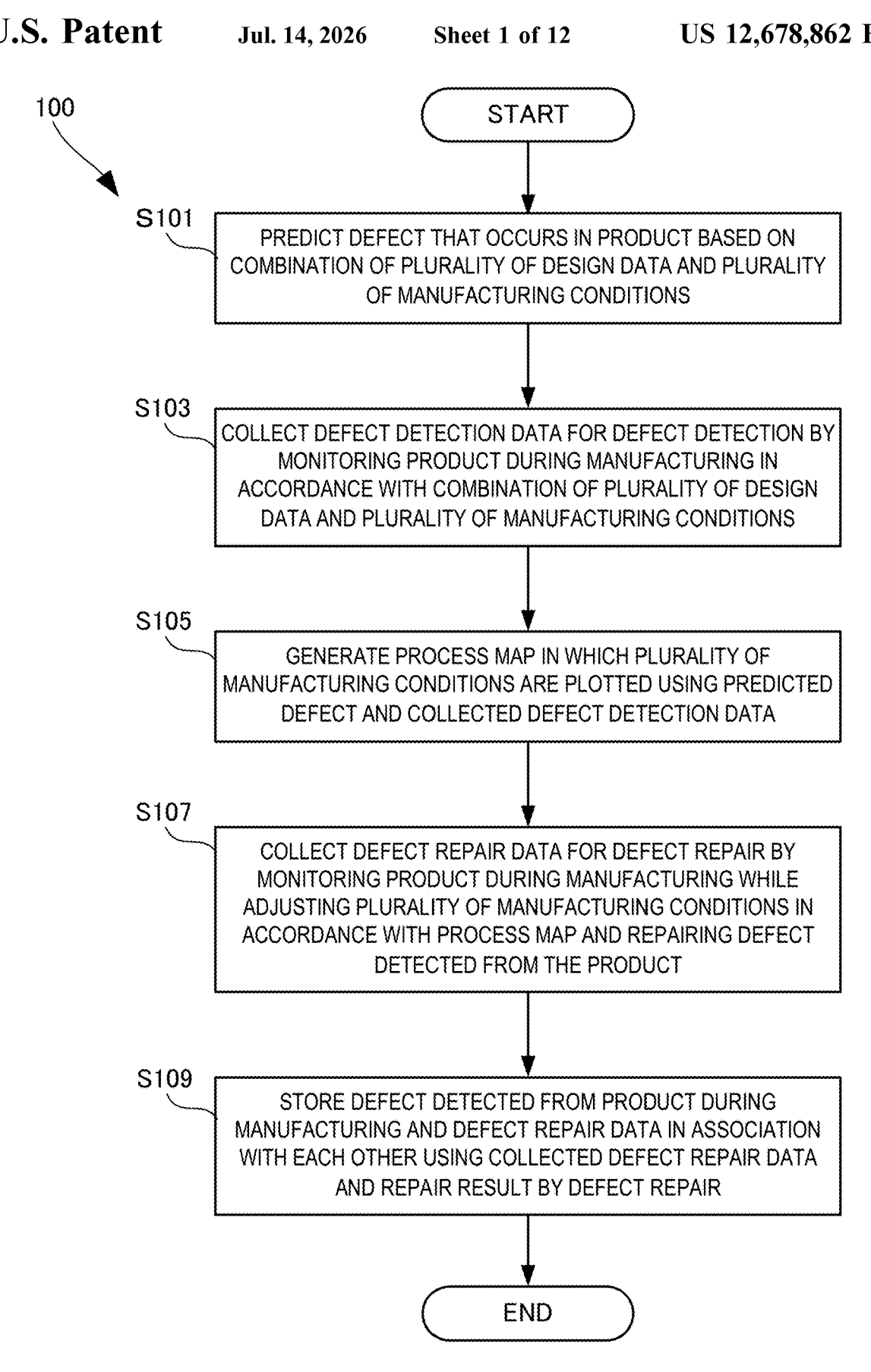

100

START

S101　PREDICT DEFECT THAT OCCURS IN PRODUCT BASED ON COMBINATION OF PLURALITY OF DESIGN DATA AND PLURALITY OF MANUFACTURING CONDITIONS

S103　COLLECT DEFECT DETECTION DATA FOR DEFECT DETECTION BY MONITORING PRODUCT DURING MANUFACTURING IN ACCORDANCE WITH COMBINATION OF PLURALITY OF DESIGN DATA AND PLURALITY OF MANUFACTURING CONDITIONS

S105　GENERATE PROCESS MAP IN WHICH PLURALITY OF MANUFACTURING CONDITIONS ARE PLOTTED USING PREDICTED DEFECT AND COLLECTED DEFECT DETECTION DATA

S107　COLLECT DEFECT REPAIR DATA FOR DEFECT REPAIR BY MONITORING PRODUCT DURING MANUFACTURING WHILE ADJUSTING PLURALITY OF MANUFACTURING CONDITIONS IN ACCORDANCE WITH PROCESS MAP AND REPAIRING DEFECT DETECTED FROM THE PRODUCT

S109　STORE DEFECT DETECTED FROM PRODUCT DURING MANUFACTURING AND DEFECT REPAIR DATA IN ASSOCIATION WITH EACH OTHER USING COLLECTED DEFECT REPAIR DATA AND REPAIR RESULT BY DEFECT REPAIR

END

| 651 CAPTURED SURFACE DATA | | | | | | | |
|---|---|---|---|---|---|---|---|
| 652 MANUFAC-TURING BOUNDARY | 653 MOLTEN REGION DATA | 654 DIVIDED SMALL REGION DATA | | 655 WHETHER REGION IS BOUNDARY REGION OR NON-BOUNDARY REGION | 656 EVALUATION TARGET DATA | 657 ROUGH-NESS DATA | 658 THRE-SHOLD | 659 EVALUATION RESULT |
| | | POSITION DATA OF SMALL REGION | IMAGE CAPTURING DATA | | | | | |
| | | | | NON-BOUNDARY | IMAGE CAPTURING DATA | | | ○ |
| | | | | NON-BOUNDARY | IMAGE CAPTURING DATA | | | × |
| | | ... | | NON-BOUNDARY | IMAGE CAPTURING DATA | | | × |
| | | | | NON-BOUNDARY | IMAGE CAPTURING DATA | | | ○ |
| | | | | BOUNDARY | COMPLEMENTARY DATA | | | ○ |
| | | ... | | BOUNDARY | COMPLEMENTARY DATA | | | ○ |
| | | | | BOUNDARY | COMPLEMENTARY DATA | | | ○ |

650

660

| 661 REPAIR COUNT | 662 COUNT THRESHOLD | 663 COUNT < THRESHOLD | 664 COUNT ≥ THRESHOLD |
|---|---|---|---|
| | | DEFECT REPAIR PROCESSING | MANUFACTURING STOP PROCESSING |

631 DEFECT REPAIR INSTRUCTION COMMAND | 632 SET MELTING ENERGY (OUTPUT, SCAN SPEED, OR BEAM DIAMETER)

FIG. 7B

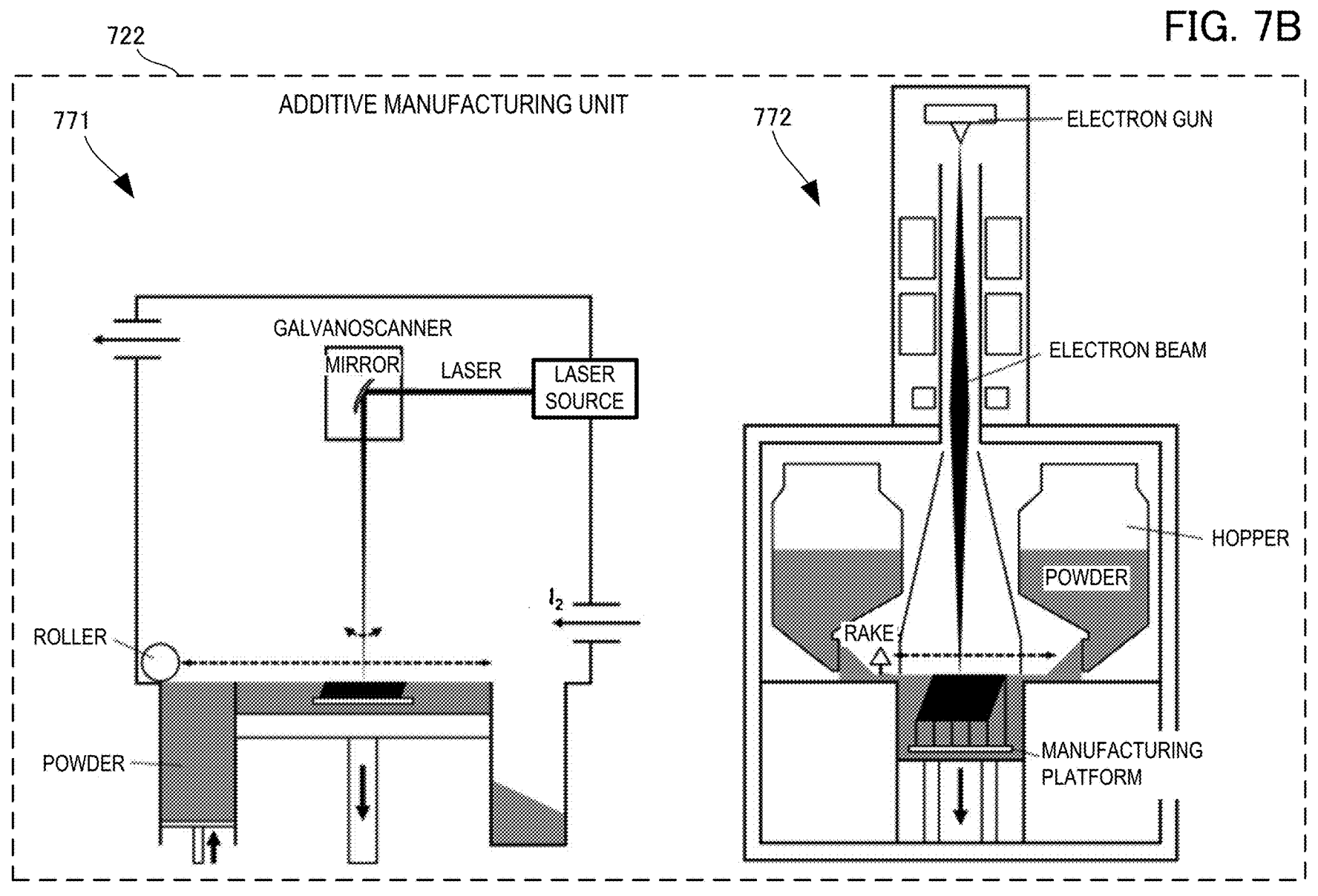

ELECTRON GUN

ELECTRON BEAM

HOPPER

POWDER

MANUFACTURING PLATFORM

RAKE

772

ADDITIVE MANUFACTURING UNIT

LASER SOURCE

GALVANOSCANNER

MIRROR

LASER $I_2$

ROLLER

POWDER

722

771

ADDITIVE MANUFACTURING DEVELOPMENT METHOD AND THREE-DIMENSIONAL ADDITIVE MANUFACTURING SYSTEM

CROSS-REFERENCE TO RELATED APPLICATIONS

This application is a National Phase application under 35 U.S.C. 371 of International Application No. PCT/JP2021/007535, filed on Feb. 26, 2021, the disclosure of which is incorporated herein in its entirety by reference.

TECHNICAL FIELD

The present invention relates to an additive manufacturing development method and a three-dimensional additive manufacturing system.

BACKGROUND ART

In the above technical field, non-patent literature 1 discloses a technique of performing in-process monitoring of a reflected electron image of a surface, causing the user of an apparatus to see the image and classify it as porous, even, or uneven, and performing plotting. However, process map creation and optimum condition derivation are techniques manually executed by the user. Also, non-patent literature 2 discloses a technique of predicting deformation by combining multiscale simulations from a powder scale to a part scale. However, to optimize the process, a lot of simulations need to be executed many times, and actual manufacturing needs to be performed to verify the simulations.

CITATION LIST

Patent Literature

Patent literature 1: WO 2020/039581

Non-Patent Literature

Non-patent literature 1: C. R. Pobel, C. Arnold, F. Osmanlic, Z. Fu, C. Korner, "Immediate development of processing windows for selective electron beam melting using layerwise monitoring via backscattered electron detection", Materials Letters, 249 (2019) 70-72.
Non-patent literature 2: W. King, A. T. Anderson, R. M. Ferencz, N. E. Hodge, C. Kamath, S. A. Khairallah, "Overview of modelling and simulation of metal powder bed fusion process at Lawrence Livermore National Laboratory", Materials Science and Technology, 31 (2015) 957-968.

SUMMARY OF THE INVENTION

Technical Problem

However, in the techniques described in the above literatures, since defect inspection after manufacturing of a product is repeated, time and cost are needed to establish manufacturing conditions for additive manufacturing or optimize defect detection or defect repair during manufacturing.

The present invention enables to provide a technique of solving the above-described problem.

Solution to Problem

One example aspect of the invention provides an additive manufacturing development method comprising:
predicting a defect that occurs in a product based on a combination of a plurality of design data and a plurality of manufacturing conditions, which are used to additively manufacture the product;
collecting defect detection data for defect detection by monitoring the product during manufacturing in accordance with the combination of the plurality of design data and the plurality of manufacturing conditions; and
generating a process map in which the plurality of manufacturing conditions are plotted using the predicted defect and the collected defect detection data.

Another example aspect of the invention provides a three-dimensional additive manufacturing system for manufacturing a three-dimensional additively manufactured object, comprising:
a defect predictor that predicts a defect that occurs in a product based on a combination of a plurality of design data and a plurality of manufacturing conditions, which are used to additively manufacture the product;
a defect detection data collector that collects defect detection data for defect detection by monitoring the product during manufacturing in accordance with the combination of the plurality of design data and the plurality of manufacturing conditions;
a process map generator that generates a process map in which the plurality of manufacturing conditions are plotted using the predicted defect and the collected defect detection data; and
an additive manufacturing unit that additively manufactures the product while adjusting the plurality of manufacturing conditions in accordance with the process map.

Advantageous Effects of Invention

According to the present invention, in development for establishing manufacturing conditions for additive manufacturing or optimizing defect detection or defect repair during manufacturing, time and cost can greatly be reduced.

BRIEF DESCRIPTION OF DRAWINGS

FIG. 1 is a flowchart showing the procedure of an additive manufacturing development method according to the first example embodiment.

FIG. 6B is a view showing the configuration of data used in defect repair during manufacturing in FIG. 2A;

FIG. 7B is a view showing the configuration of an additive manufacturing unit according to the third example embodiment.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An additive manufacturing development method 100 according to the first example embodiment of the present invention will be described with reference to FIG. 1. The additive manufacturing development method 100 is a method of development for establishing manufacturing conditions or optimizing defect detection or defect repair during manufacturing.

As shown in FIG. 1, the additive manufacturing development method 100 includes a defect prediction step S101, a defect detection data collection step S103, and a process map generation step S105. In the defect prediction step S101, a defect that occurs in a product is predicted based on a combination of a plurality of design data and a plurality of manufacturing conditions used for additively manufacturing of the product. In the defect detection data collection step S103, defect detection data for defect detection is collected by monitoring the product during manufacturing in accordance with the combination of the plurality of design data and the plurality of manufacturing conditions. In the process map generation step S105, a process map in which the plurality of manufacturing conditions are plotted is generated using the predicted defect and the collected defect detection data.

The additive manufacturing development method 100 further includes a defect repair data collection step S107 and a defect repair data storage step S109. In the defect repair data collection step S107, defect repair data for defect repair is collected by monitoring the product during manufacturing while adjusting the plurality of manufacturing conditions in accordance with the process map and repairing a defect detected from the product. In the defect repair data storage step S109, the defect detected from the product during manufacturing and the defect repair data are stored in association with each other using the collected defect repair data and a repair result by the defect repair.

According to this example embodiment, in development for establishing manufacturing conditions for additive manufacturing or optimizing defect detection or defect repair during manufacturing, time and cost can greatly be reduced.

Second Example Embodiment

An additive manufacturing development method according to the second example embodiment of the present invention will be described next. The additive manufacturing development method according to this example embodiment shows the processing of each step of the additive manufacturing development method according to the first example embodiment in more detail.

Problem of Technical Premises

Figure 2A:
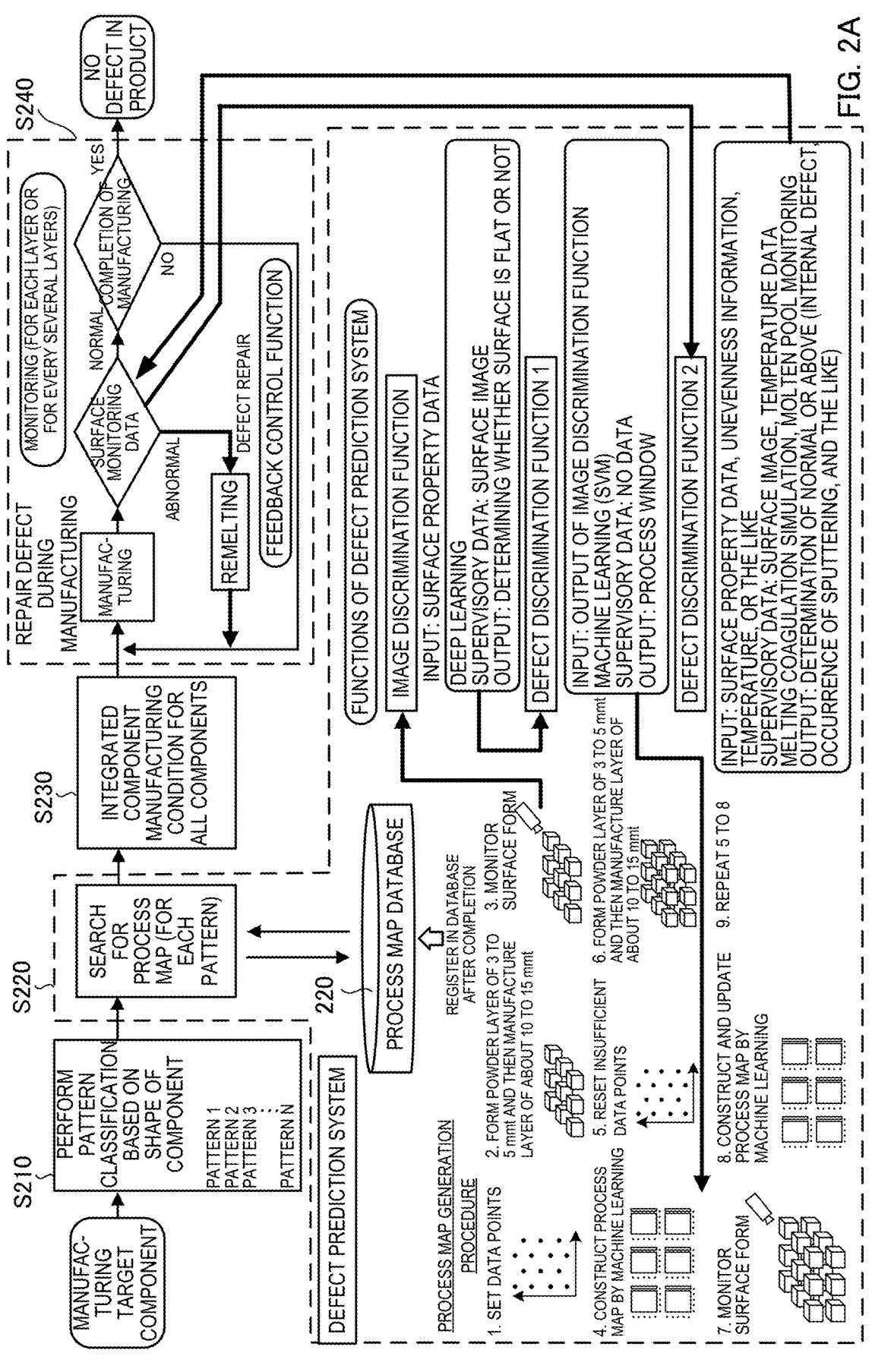
FIG. 2A is a view for explaining an additive manufacturing development method according to the second example embodiment.
Figure 2B:
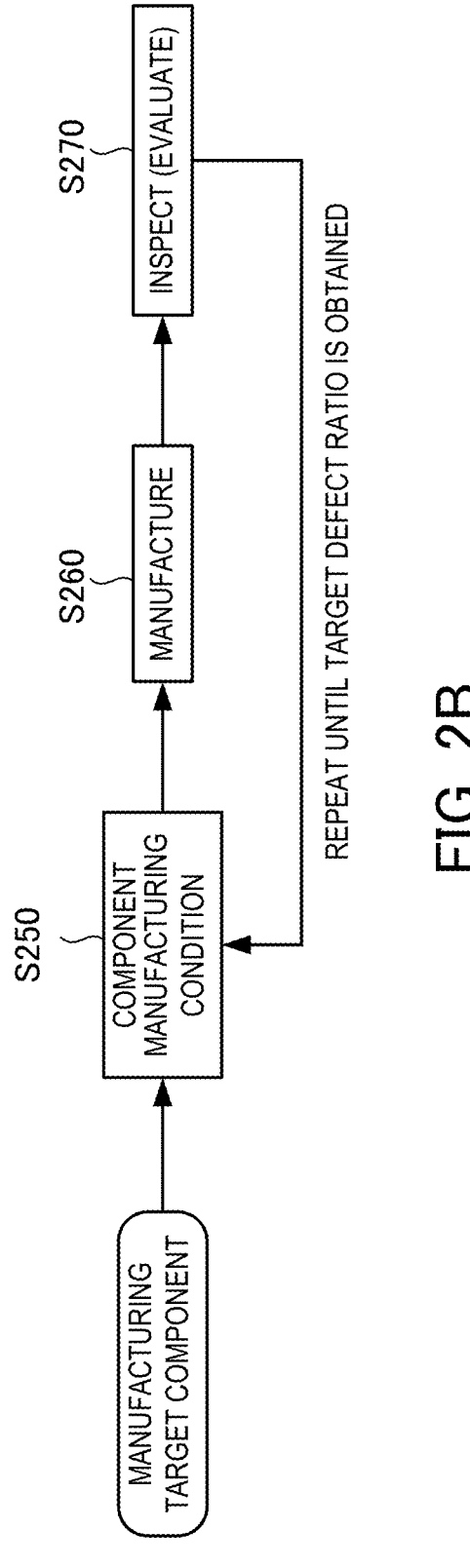
FIG. 2B is a view for explaining an existing additive manufacturing development method.

The following is an explanation of an existing additive manufacturing development method with reference to FIG. 2B.

For example, a conventional procedure of manufacturing a defect-free metal component using metal additive manufacturing is as follows. A user executes manufacturing (S260) under a manufacturing condition A (S250) set by the user, measures the defect ratio of an obtained manufactured product, and evaluates whether a manufactured product as requested is obtained (S270). Based on the evaluation result, the user adjusts the manufacturing condition, performs manufacturing under an adjusted condition B, and adjusts the manufacturing condition again based on the evaluation result of the manufactured product. This processing (S250→S260→S270) is repeated until a required defect ratio is obtained. The repetitive man-hour is very large, and time and cost are needed. For example, there is an attempt of using simulations instead of an actual manufacturing test and thus reducing the cost of experiments. However, this requires specialized knowledge on metal additive manufacturing and also needs a supercomputer in some cases, and therefore, a general user is often unable to do this. In addition, a simulation always needs verification by experiments, and the cost of experiments is not necessarily low.

Additive Manufacturing Development Method of this Example Embodiment

An object of the additive manufacturing development method according to this example embodiment is to standardize steps from optimization of manufacturing conditions for a metal component of a material/shape required by a user to component manufacturing, thereby allowing a user without specialized knowledge to efficiently develop a defect-free component in a short time.

FIG. 2A is a view for explaining the additive manufacturing development method according to this example embodiment. The additive manufacturing development method shown in FIG. 2A includes step S210 of performing pattern classification based on the shape of a manufacturing target component, and step S220 of searching for a process map generated for each pattern-classified pattern. The additive manufacturing development method shown in FIG. 2A further includes step S230 of generating an integrated component manufacturing condition for all components, and step S240 of repairing a defect while monitoring the surface of the product during manufacturing.

In step S210, pattern classification is performed based on a component shape. For example, pattern classification is perfumed based on a scan path length and a distance from underskin. In addition, pattern classification is perfumed based on a melting area and a tilt angle. In step S220, a process map is searched for in correspondence with each pattern. In this case, if process maps stored in a process map database 220 exist, an optimum condition is decided using these. On the other hand, if process maps do not exist or are insufficient, a process map is generated, and an optimum condition is then decided.

Here, to generated a process map, for example, the method of patent literature 1 may be used. That is, in the process map generation, the following functions are included.

Functions of Defect Prediction System (Image discrimination function) input: deep learning using surface property data, supervisory data: surface image, output: determining whether the surface is flat or not (Defect discrimination function 1) input: machine learning (SVM) using the output of the image discrimination function, supervisory data: no data, output: process window (Defect discrimination function 2) input: deep learning using surface property data, unevenness information, temperature, or the like, supervisory data: surface image, temperature data, melting coagulation simulation or molten pool monitoring, output: determination of normal or abnormal (internal defect, occurrence of sputtering, and the like)

Detailed Example of Each Step

Concerning each step shown in FIG. 2A, a detailed example of processing will be described below with reference to FIGS. 2A to 6B.

(Pattern Classification: S210)

Figure 3:
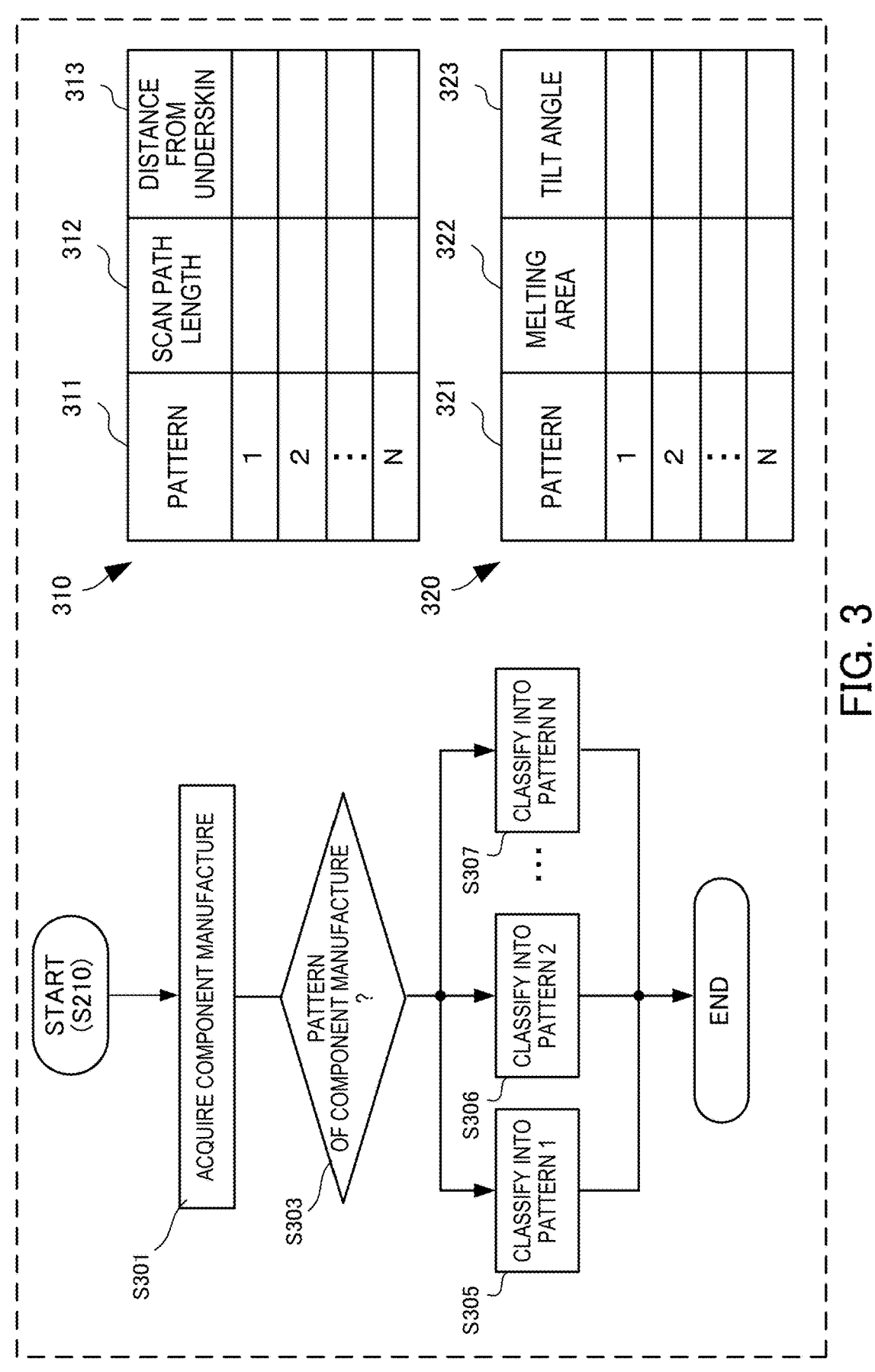
FIG. 3 is a view for explaining pattern classification in FIG. 2A.

FIG. 3 is a view for explaining pattern classification in FIG. 2A.

Referring to FIG. 3, pattern classification is performed based on the shape of a manufacturing target component using pattern classification data 310 or 320. The pattern classification data 310 stores a scan path length 312 and a distance 313 from underskin, which are pattern classification conditions, in association with a pattern 311. The pattern classification data 320 stores a melting area 322 and a tilt angle 323, which are pattern classification conditions, in association with a pattern 321.

The pattern classification S210 is formed by the following steps. In step S301, the shape of the manufacturing target component is acquired. In step S303, the pattern of the component shape is classified using the pattern classification data 310 or 320. In step S305, the pattern is classified into pattern 1. In step S306, the pattern is classified into pattern 2. In step S307, the pattern is classified into pattern N.

(Process Map Generation: S220)

Figure 4A:
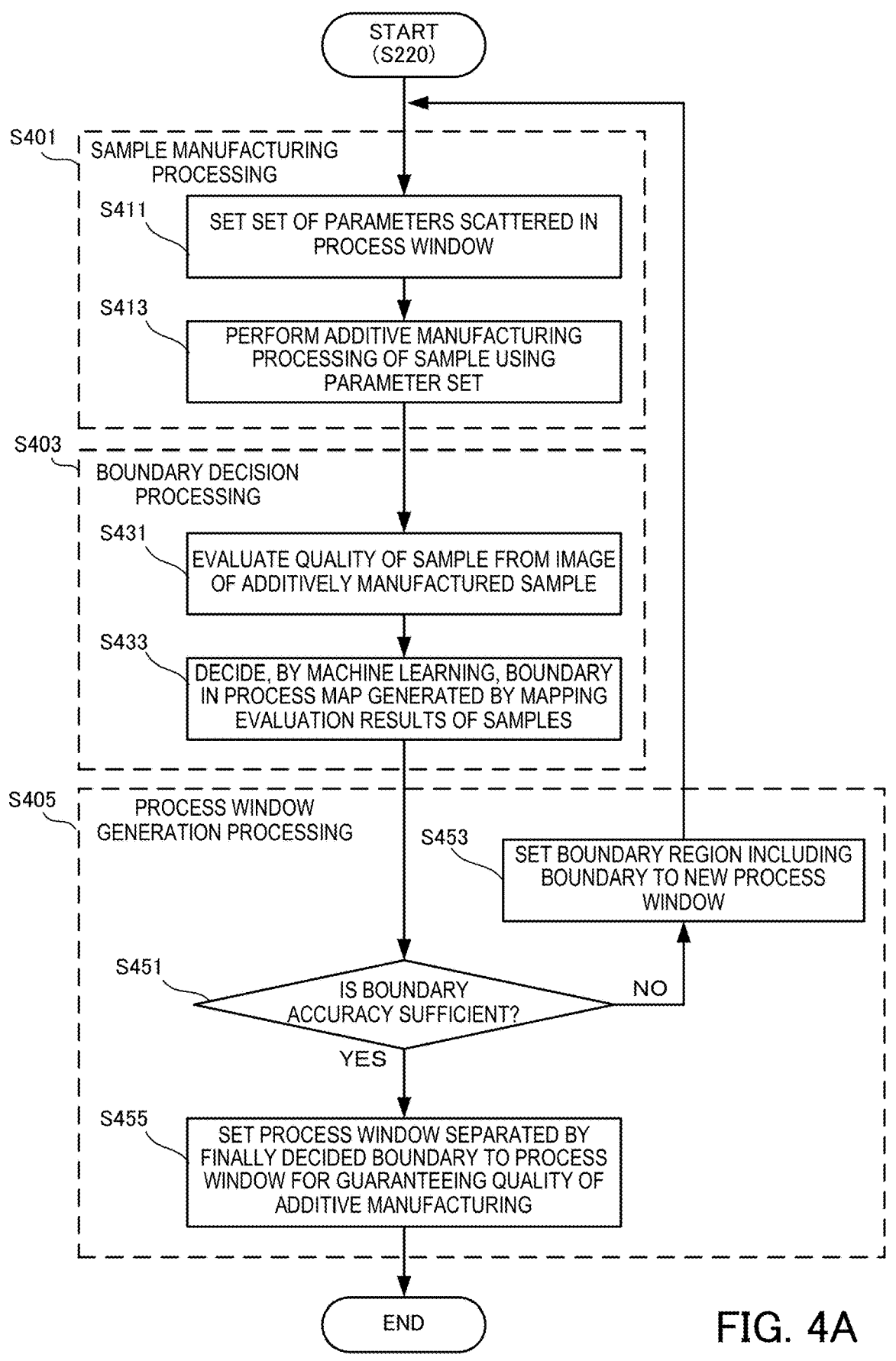
FIG. 4A is a flowchart showing the procedure of process map generation in FIG. 2A.

FIG. 4A is a view for explaining an example of process map generation in FIG. 2A.

Referring to FIG. 4A, a process window generation method in the additive manufacturing system includes sample manufacturing processing (S401), boundary decision processing (S403), and process window generation processing (S405).

The sample manufacturing processing (S401) corresponds to "1. data point setting", and "2. manufacturing of plural samples" in FIG. 2 An additive manufacturing of a sample is performed using a set of at least two parameters for controlling additive manufacturing, which are scattered in the process window. The sample manufacturing processing (S401) includes step S411 of setting a set of parameters scattered in the process window, and step S413 that is additive manufacturing processing of a sample using the parameter set.

Also, the boundary decision processing (S403) corresponds to "3. surface form monitoring" and "4. process window construction by machine learning" in FIG. 2A. In a process map generated by mapping an evaluation result obtained by evaluating the quality of each additively manufactured sample, the boundary of the evaluation result is decided by machine learning. The boundary decision processing (S403) includes step S431 of evaluating the quality of a sample from an image of the additively manufactured sample, and step S433 of deciding, by machine learning, a boundary in the process map generated by mapping the evaluation results of samples.

The process window generation processing (S405) corresponds to "5. resetting of insufficient data points" and "6 to 9. subsequent sample manufacturing→monitoring→process window construction" in FIG. 2A. In the process window generation processing (S405), using a boundary region including the decided boundary as a new process window, the sample manufacturing step and the boundary decision step are repeated, and a process window separated by a finally decided boundary is generated as a process window for guaranteeing the quality of additive manufacturing. The process window generation processing (S405) includes step S451 of determining whether boundary accuracy is sufficient or not, and step S453 of setting a boundary region including a boundary to a new process window if the boundary accuracy is not sufficient. The process window generation processing (S405) also includes step S455 of setting a process window separated by a boundary finally decided based on an end condition such as a sufficient boundary accuracy to a process window for guaranteeing the quality of additive manufacturing.

Figure 4B:
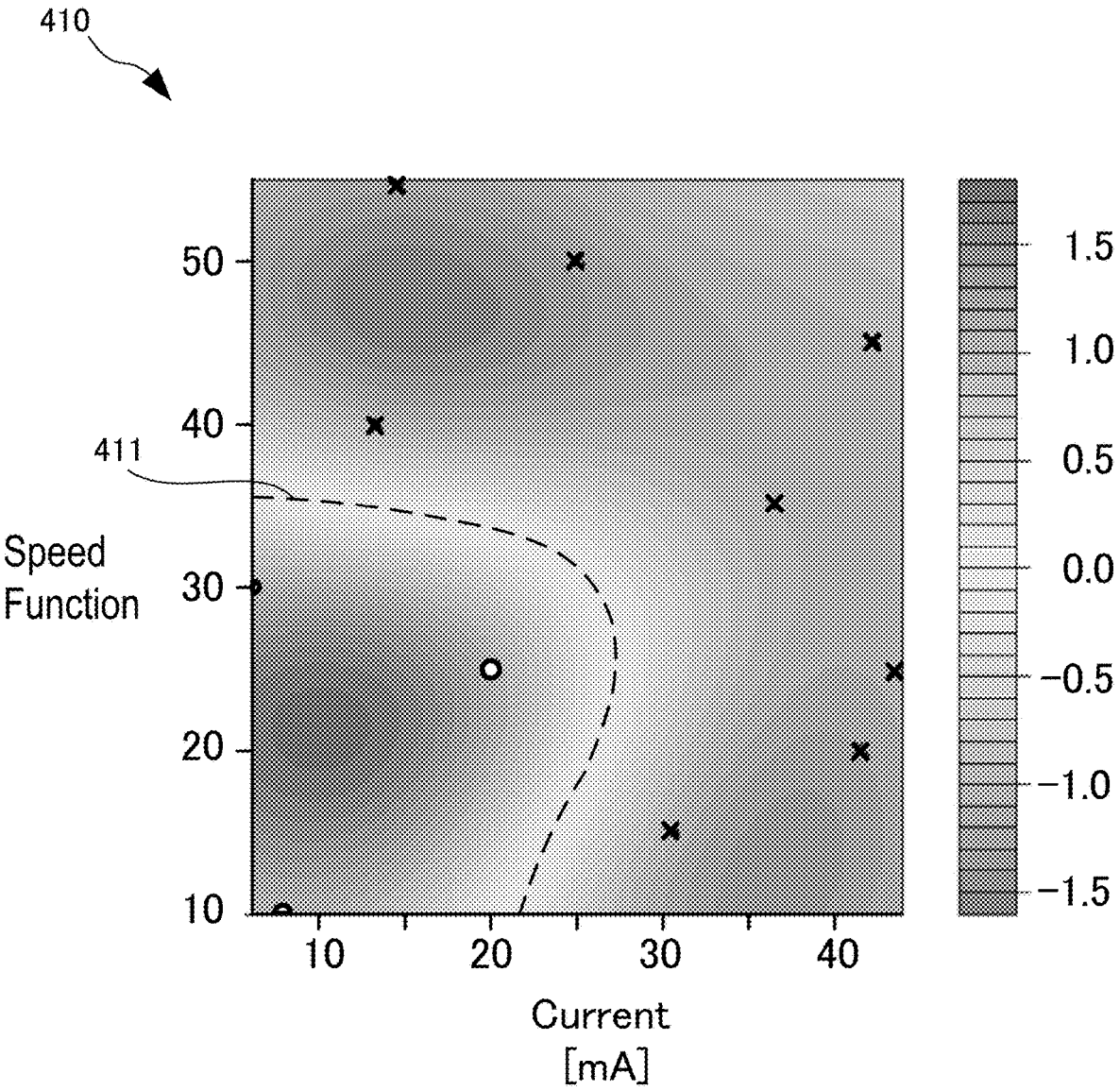
FIG. 4B is a view for explaining an example of process map generation in FIG. 2A.

FIG. 4B is a view for explaining an example of a process map 410 generated by process map generation in FIG. 2A. FIG. 4B shows a result of assigning an image position as ○ (+1)/×(−1) and obtaining a decision function representing a boundary using support vector machine. In FIG. 4B, to make a boundary portion clear, it is indicated by a temporary broken line 411.

Figure 4C:
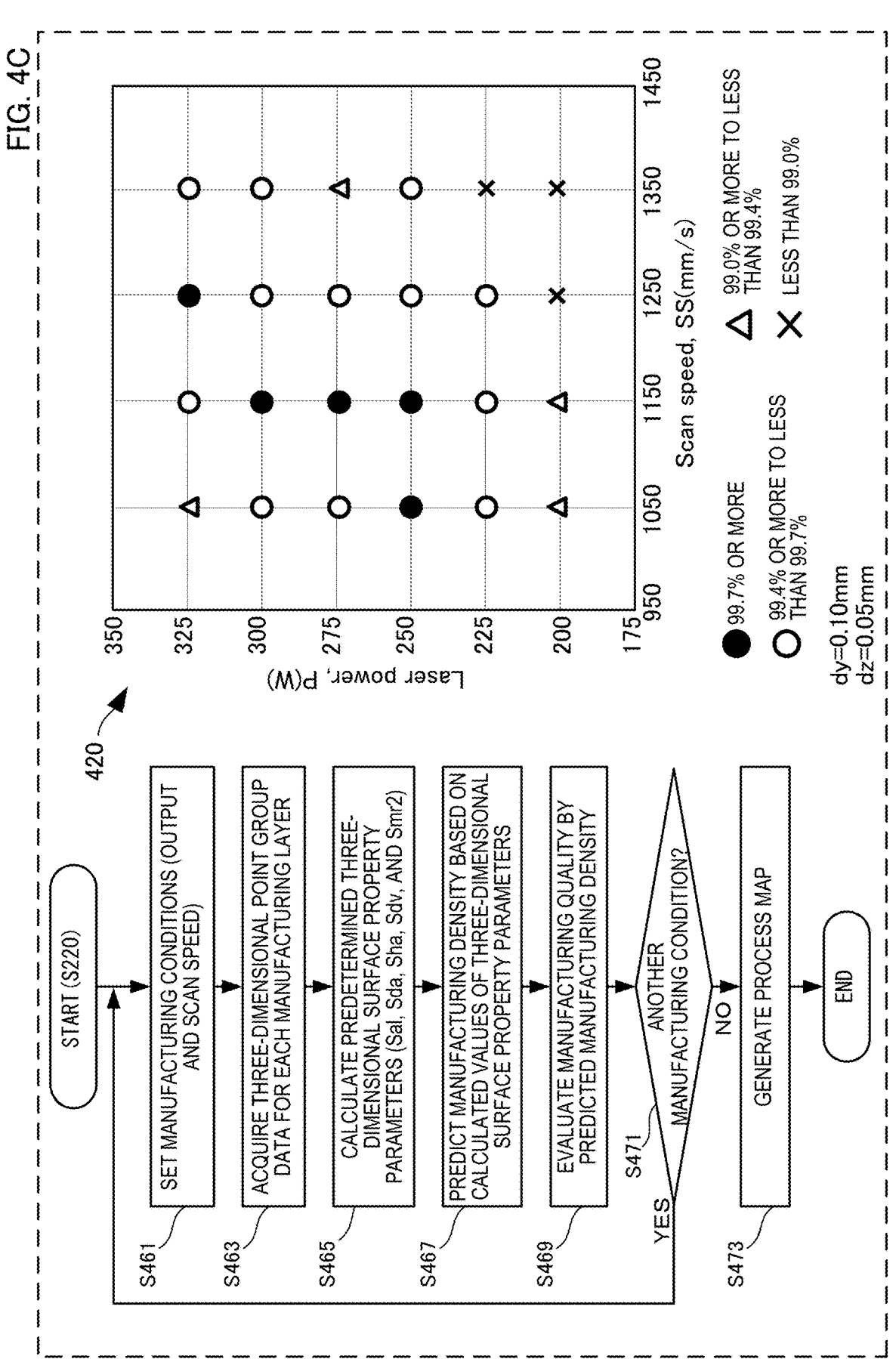
FIG. 4C is a view for explaining another example of process map generation in FIG. 2A.

FIG. 4C is a view for explaining another example of process map generation in FIG. 2A.

In step S461, manufacturing conditions (an output and a scan speed) are set. In step S463, three-dimensional point group data is acquired for each manufacturing layer. The three-dimensional point group data according to this example embodiment is data obtained by, when manufacturing an additively manufactured object, capturing the surface of a product, the manufacturing surface of each layer, or the surface of the powder bed of each layer using a camera and representing each point on the surface using (x, y) coordinates and a z coordinate in the height direction.

Next, in step S465, three-dimensional surface property parameters are calculated from the acquired three-dimensional point group data. Here, the three-dimensional surface property parameters are parameters for expressing a surface roughness defined by the international standard (ISO 25178). In this example embodiment, as preferable three-dimensional surface property parameters for predicting the relative density of a product from the surface property of additive manufacturing, minimum autocorrelation lengths Sal, Sda, Sha, Sdv, and Smr2 of a surface are selected.

In step S467, the relative density of the product is predicted based on the calculated three-dimensional surface property parameters. Note that the relative relationship between the calculated values of the three-dimensional surface property parameters and the relative density of the manufactured product is stored based on the relative density measured from the additively manufactured object and the values of the three-dimensional surface property parameters during manufacturing or after manufacturing.

In step S469, manufacturing quality is evaluated by a manufacturing density predicted based on the three-dimensional surface property parameters. The predicted value of the manufacturing density is used for evaluating whether the manufacturing density of the product after manufacturing is manufactured at a desired density. If it is predicted that the predicted value of the manufacturing density is less than the necessary relative density, it may be used to adjust a manufacturing condition, particularly, a laser intensity or an energy density by the scan speed. In this case, it is preferable to prepare a process map of the relative density by the combination of a laser intensity and a scan speed in advance and select an adjustment method.

In step S471, the manufacturing conditions in step S461 are changed, and manufacturing evaluation is repeated. If predetermined manufacturing and evaluation data are obtained, in step S473, a process map is generated.

A process map 420 generated in this example embodiment is shown in the right view of FIG. 4C. The generated process map 420 is thus prepared, thereby generating point group data from a surface image captured after manufacturing of at least one layer. Appropriate three-dimensional surface property parameters are calculated from the generated point group data. Based on the three-dimensional surface property parameters, the manufacturing density is predicted, and control can be performed such that the manufacturing density becomes a manufacturing density necessary for a product. For example, if the manufacturing density is stably equal to or higher than the necessary manufacturing density, manufacturing is continued. If the manufacturing density is predicted to lower, remelting is performed under the same conditions, or the laser output or the scan speed is adjusted to increase the manufacturing density. Even if the manufacturing density is equal to or higher than the necessary manufacturing density, if the manufacturing density is predicted to be unstable, the laser output or the scan speed is changed to a level at which the manufacturing density stabilizes.

(Integration of Component Manufacturing Conditions: S230)

Figure 5:
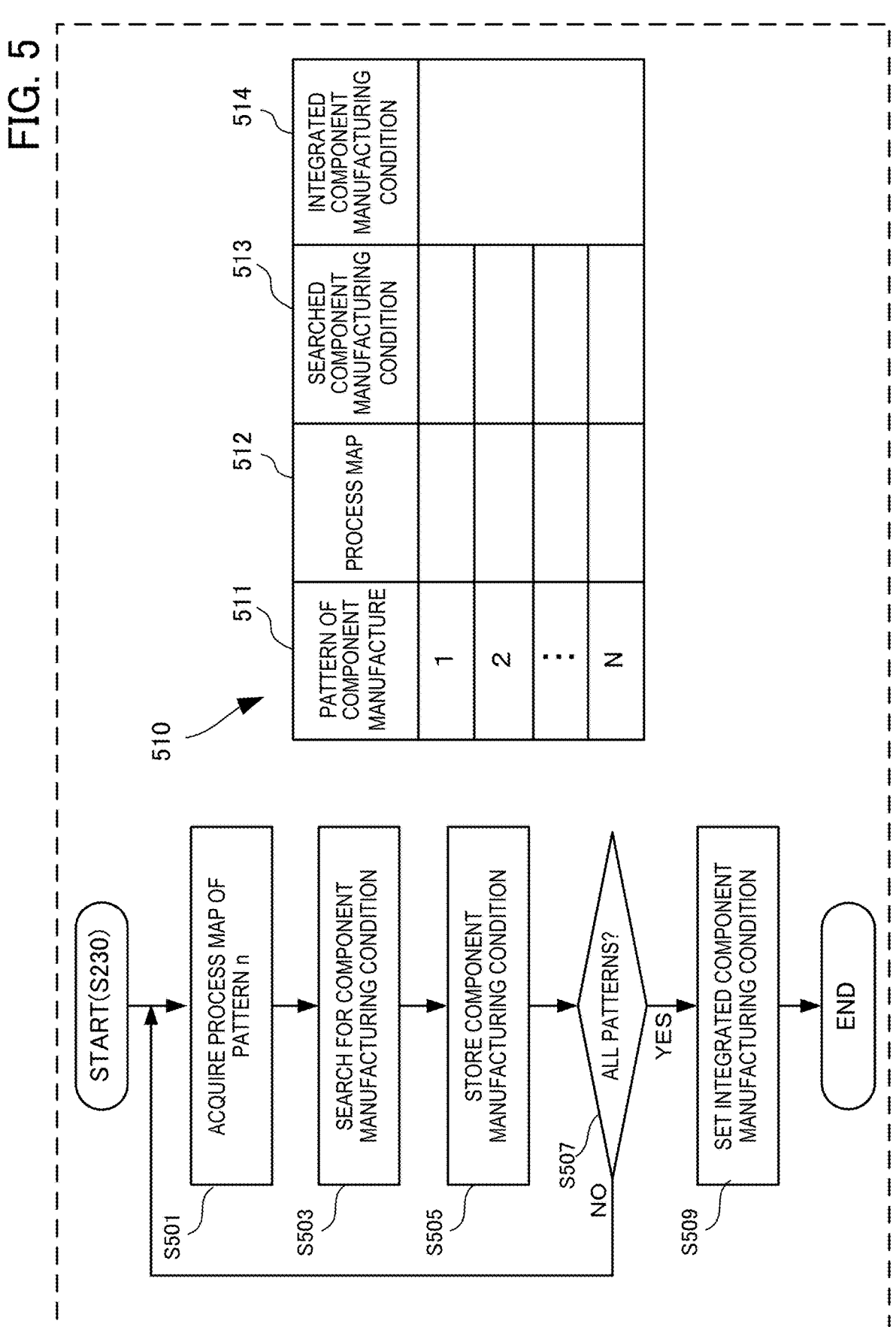
FIG. 5 is a view for explaining integration of component manufacturing conditions in FIG. 2A.

FIG. 5 is a view for explaining integration of component manufacturing conditions in FIG. 2A.

In step S501, a process map of pattern n (N≥n≥1) is acquired. In step S503, a component manufacturing condition is searched from each process map. In step S505, the component manufacturing condition of the search result is stored. In step S507, it is determined whether component manufacturing conditions are searched or stored for all patterns or necessary patterns. If sufficient component manufacturing conditions are stored, in step S509, an integrated component manufacturing condition is set.

The right view of FIG. 5 shows a table 510 used to integrate the component manufacturing conditions. In the table 510, a generated process map 512, a component manufacturing condition 513 searched by the process map 512, and an integrated component manufacturing condition 514 are stored in association with a pattern 511 of a component shape.

(Defect Repair During Manufacturing: S240)

Figure 6A:
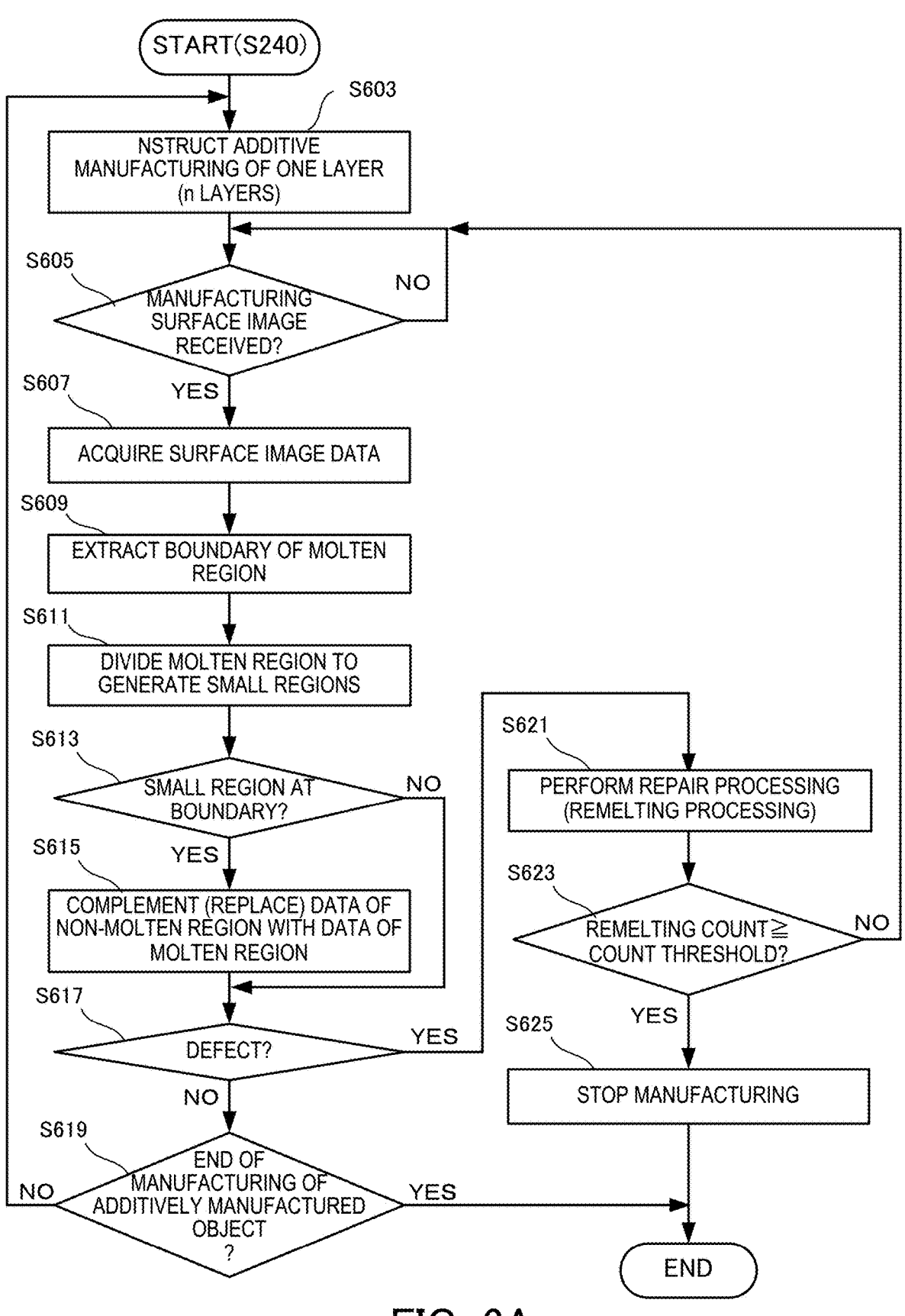
FIG. 6A is a flowchart showing a defect repair procedure during manufacturing in FIG. 2A.

FIG. 6A is a view for explaining defect repair during manufacturing in FIG. 2A.

In step S603, additive manufacturing of one layer (n layers) is instructed. Here, in a case of n layers, defect determination and repair are performed for every n layers. In step S605, reception of a manufacturing surface image is waited. If a manufacturing surface image is received, in step S607, surface image data is acquired. In step S609, the boundary between a molten region and a non-molten region is extracted based on the surface image data. In step S611, the molten region is divided, thereby generating small regions.

In step S613, it is determined whether a small region is located at the boundary between the molten region and the non-molten region. If a small region is located at the boundary between the molten region and the non-molten region, in step S615, the data of the non-molten region is complemented (replaced) with the data of the molten region. In step S617, it is determined whether a defect exists in each of the small regions of the molten region and the complemented small regions of the non-molten region. If there is no defect, and it is determined in step S619 not to end manufacturing, the process returns to step S603 to perform additive manufacturing of the next layer (n layers).

If a defect exists, in step S621, remelting is performed as repair processing for the small region with the defect. Note that if manufacturing quality is allowed to be relatively low, not repair on a small region basis but remelting for the entire molten region or a predetermined region including the defective small region may be performed. In step S623, a remelting count is compared with a count threshold, and if the remelting count is less than the count threshold, the process returns to step S605 to repeat remelting. On the other hand, if the remelting count is equal to or more than the count threshold, in step S625, manufacturing is stopped. Note that although a case where an unrepairable defect occurs in step S617 is not illustrated in FIG. 6A, in that case, manufacturing is stopped in step S625.

FIG. 6B is a view showing the configuration of data used in defect repair during manufacturing in FIG. 2A. The upper view of FIG. 6B shows the configuration of a defect determination table 650 used to detect a defect.

The defect determination table 650 stores captured surface data 651 transferred from a surface image acquirer 505, a manufacturing boundary 652 extracted from the captured surface data 651, and molten region data 653. The defect determination table 650 also stores small region data 654 divided into small regions from the molten region data 653. The small region data 654 includes the position data of a small region on the manufacturing surface, and the image capturing data of the small region. Also, the defect determination table 650 stores data 655 representing whether a small region is a boundary small region or another non-boundary small region, image capturing data that is evaluation target data 656 of a non-boundary small region, and complementary data that is the evaluation target data 656 of a boundary small region. The defect determination table 650 also stores roughness data 657 derived from the image capturing data of the non-boundary small region, and the roughness data 657 derived from the complementary data of the boundary region. Finally, the defect determination table 650 stores an evaluation result 659 based on a defect determination threshold 658. If the roughness data 657 is equal to or more than the threshold 658, it is determined that a defect exists in the small region. If the roughness data 657 is less than the threshold 658, it is determined that no defect exists in the small region.

Note that a simple method has been described as the defect determination, but machine learning (deep learning, CNN, support vector machine, random forest, Naive Bayes, or the like) may be used (see patent literature 2).

FIG. 6B is a view showing the configuration of a defect repair table 660 used to repair a defect.

The defect repair table 660 stores a repair count 661 counted by a repair count counter, a count threshold 662, defect repair processing corresponding to a case 663 where repair count<count threshold, and manufacturing stop processing corresponding to a case 664 where repair count-≥count threshold. In linkage with the defect repair processing, a defect repair instruction command 631 and a set melting energy (an output, a scan speed, or a beam diameter) 632, which are sent to the additive manufacturing apparatus, are stored.

According to this example embodiment, in development for establishing manufacturing conditions for additive manufacturing or optimizing defect detection or defect repair during manufacturing, time and cost can greatly be reduced. In addition, time and cost required to develop a defect-free metal component using metal additive manufacturing can greatly be reduced.

Third Example Embodiment

A three-dimensional additive manufacturing system according to the third example embodiment of the present invention will be described next. The three-dimensional additive manufacturing system according to this example embodiment is configured by including the additive manufacturing development method according to the second example embodiment in a three-dimensional additive manufacturing system. As for the operation, a detailed description of the same parts as in the second example embodiment will be omitted.

Configuration of Three-Dimensional Additive Manufacturing System

Figure 7A:
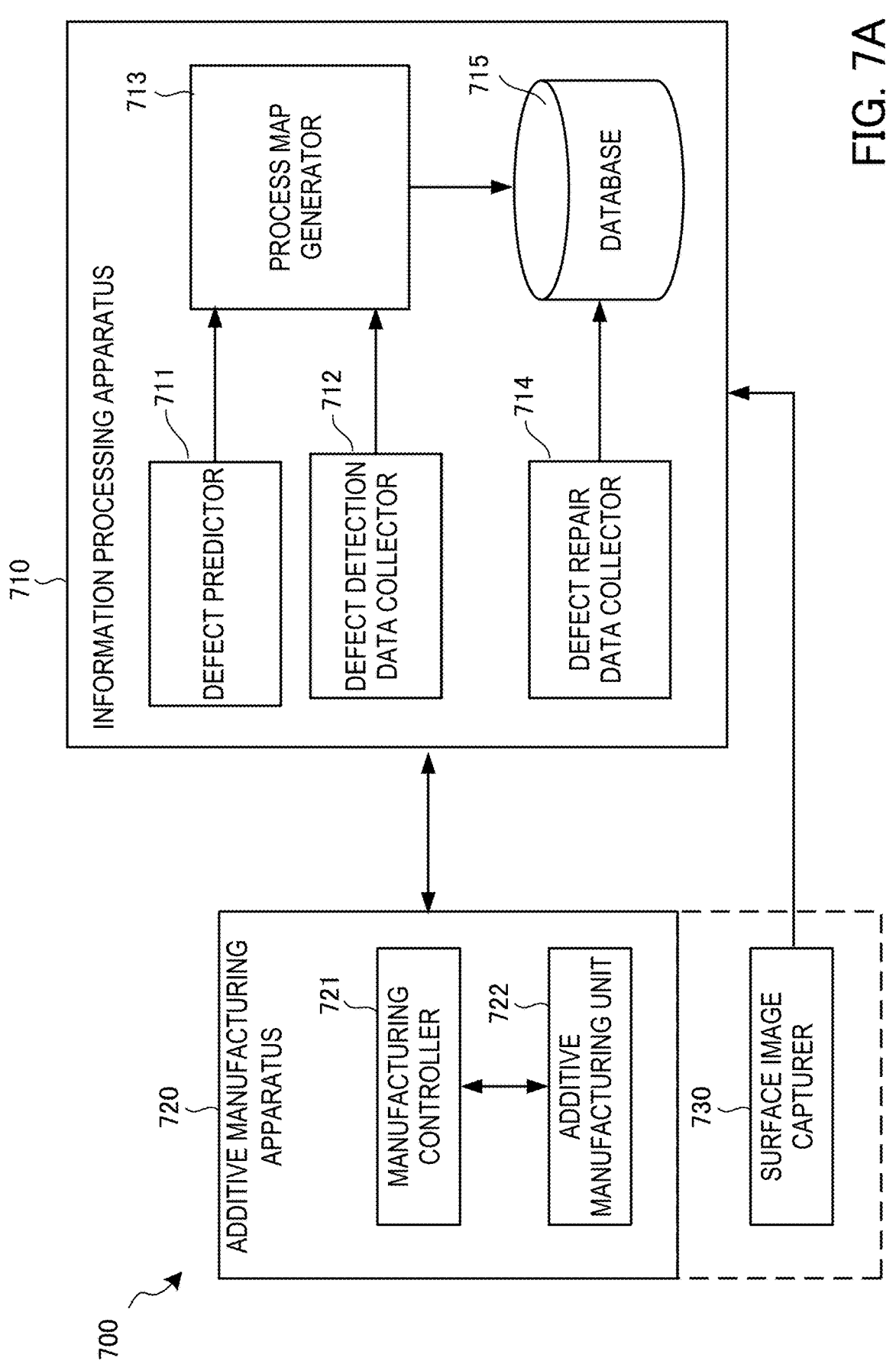
FIG. 7A is a block diagram showing the configuration of a three-dimensional additive manufacturing system according to the third example embodiment.

FIG. 7A is a block diagram showing the configuration of a three-dimensional additive manufacturing system 700 according to this example embodiment.

The three-dimensional additive manufacturing system 700 includes an information processing apparatus 710 according to this example embodiment, an additive manufacturing apparatus 720, and a surface image capturer 730. Note that the surface image capturer 730 may be incorporated in the additive manufacturing apparatus 720 or separately installed. The information processing apparatus 710 includes a defect predictor 711, a defect detection data collector 712, a process map generator 713, a defect repair data collector 714, and a database 715.

The defect predictor 711 predicts a defect that occurs in a product based on a combination of a plurality of design data and a plurality of manufacturing conditions. The defect detection data collector 712 collects defect detection data for defect detection by monitoring the product during manufacturing in accordance with the combination of the plurality of design data and the plurality of manufacturing conditions. The process map generator 713 generates a process map in which the plurality of manufacturing conditions are plotted using the predicted defect and the collected defect detection data. The defect repair data collector 714 generates a process map in which the plurality of manufacturing conditions are plotted using the predicted defect and the collected defect detection data. The database 715 includes the process map database 220 shown in FIG. 2A, and also serves as a manufacturing data storage unit for a target additively manufactured object or a defect repair data storage unit.

The additive manufacturing apparatus 720 includes a manufacturing controller 721 that controls an additive manufacturing unit 722 to manufacture an additively manufactured object in accordance with an instruction from the information processing apparatus 710, and the additive manufacturing unit 722 that manufactures an additively manufactured object in accordance with control of the manufacturing controller 721. The surface image capturer 730 captures the surface before and after melting of each layer of the additively manufactured object. Note that the surface image capturer 730 may be an X-ray camera capable of capturing an internal structure without processing such as cutting of the additively manufactured object.

(Additive Manufacturing Unit)

FIG. 7B is a view showing the configuration of the additive manufacturing unit 722 according to this example embodiment.

An additive manufacturing unit 771 shown in FIG. 7B is an additive manufacturing unit of a powder bed method using a laser melting method, and this method is called SLM (Selective Laser Melting). On the other hand, an additive manufacturing unit 772 shown in FIG. 7B is an additive manufacturing unit of a powder bed method using an electron beam melting method, and the method is called EBM (Electron Beam Melting). In this example embodiment, electron beam melting (EBM) will be described as an example. However, the system can be applied to selective laser melting (SLM), and the same effect can be obtained. Note that the configurations of the additive manufacturing units 771 and 772 shown in FIG. 7B are merely examples, and are not limited to these. For example, powder supply of the additive manufacturing unit 772 may be configured like the additive manufacturing unit 771.

According to this example embodiment, steps from optimization of manufacturing conditions for a metal component of a material/shape required by a user to component manufacturing are automated, thereby allowing a user without specialized knowledge to efficiently develop a defect-free component in a short time.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A three-dimensional additive manufacturing system for manufacturing a three-dimensional additively manufactured object by using an electron beam melting method or a laser melting method, comprising:

a defect predictor that predicts a defect that occurs in a product based on a combination of a plurality of design data and a plurality of manufacturing conditions, which are used to additively manufacture the product;

a defect detection data collector that collects defect detection data for defect detection by monitoring the product during manufacturing in accordance with the combination of the plurality of design data and the plurality of manufacturing conditions;

a process map generator that generates a process map in which the plurality of manufacturing conditions are plotted using the predicted defect and the collected defect detection data;

an additive manufacturing unit that additively manufactures the product while adjusting the plurality of manufacturing conditions in accordance with the process map; and a defect repair data collector that collects defect repair data for defect repair by monitoring the product during manufacturing while adjusting the plurality of manufacturing conditions in accordance with the process map and repairing a defect detected from the product.

2. The three-dimensional additive manufacturing system according to claim 1, further comprising:

defect repair data storage unit that stores the defect detected from the product during manufacturing and the defect repair data in association with each other using the collected defect repair data and a repair result by the defect repair, wherein the additive manufacturing unit repairs the defect detected from a subsequent product in accordance with the stored defect repair data.

3. The three-dimensional additive manufacturing system according to claim 1, further comprising:

a defect repair data storage unit that stores the defect detected from the product during manufacturing and the defect repair data in association with each other using the collected defect repair data and a repair result by the defect repair.

4. The three-dimensional additive manufacturing system according to claim 1, wherein the defect detection data collector and the defect repair data collector monitor the product before and after melting for each layer of the product, and wherein the defect detection data and the defect repair data include surface property data.

5. The three-dimensional additive manufacturing system according to claim 1, wherein pattern classification is performed for the plurality of design data in correspondence with a shape of the product.

6. The three-dimensional additive manufacturing system according to claim 5, wherein the pattern classification is performed based on at least one selected from a group of a scan path length and a distance from underskin, or based on at least one selected from a group of a melting area and a tilt angle.

* * * * *